United States Patent [19]
Ayotte

[11] 4,091,534
[45] May 30, 1978

[54] NUT SHELLING DEVICE

[75] Inventor: Gordon Ayotte, St. Leonard, Canada

[73] Assignee: The Raymond Lee Organization, Inc., New York, N.Y. ; a part interest

[21] Appl. No.: 796,158

[22] Filed: May 12, 1977

[51] Int. Cl.² .................. A47J 43/26; B26B 17/00
[52] U.S. Cl. ................................... 30/120.2; 99/575
[58] Field of Search ............... 30/120.2, 120.1, 120.3; 99/575

[56] References Cited

U.S. PATENT DOCUMENTS

| 1,332 | 1/1798 | Bruff | 99/575 |
| 113,889 | 4/1871 | Johnson | 99/575 |
| 1,094,698 | 4/1914 | Bostrom | 30/120.2 |
| 1,257,306 | 2/1918 | Blatt | 99/575 |
| 1,883,529 | 10/1932 | Buckwalter | 30/120.2 |

FOREIGN PATENT DOCUMENTS 998,952  9/1951  France ................................ 99/575

Primary Examiner—Al Lawrence Smith
Assistant Examiner—J. T. Zatarga
Attorney, Agent, or Firm—Daniel Jay Tick

[57] ABSTRACT

A plurality of pointed nail-like members extend from a surface of a circular base plate in spaced mutual relation parallel to the axis thereof. A cylindrical side is affixed to the base plate around the circumference thereof. A plurality of pointed nail-like members extend from a surface of a circular cover plate in spaced mutual relation parallel to the axis thereof. The cover plate is releasably secured to the base plate with the nail-like members of each pointed toward the other with the points spaced from each other whereby when the cover plate is coaxially secured to the base plate with a plurality of nuts placed on the base plate and the cover plate is rotated back and forth relative to the base plate a plurality of times, most of the nuts are shelled.

1 Claim, 8 Drawing Figures

NUT SHELLING DEVICE

BACKGROUND OF THE INVENTION

The present invention relates to a nut shelling device. More particularly, the invention relates to a nut shelling device for shelling a plurality of nuts simultaneously.

Objects of the invention are to provide a nut shelling device of simple structure, which is inexpensive in manufacture, used with facility, convenience and safety, and functions efficiently, effectively and reliably to shell a plurality of hazel or other similar type of nuts, simultaneously.

BRIEF DESCRIPTION OF THE DRAWINGS

In order that the invention may be readily carried into effect, it will now be described with reference to the accompanying drawings, wherein.

DETAILED DESCRIPTION OF THE INVENTION

Figure 3:
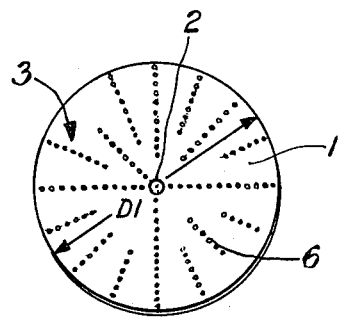
FIG. 3 is a plan view of an embodiment of the base plate of the embodiment of FIG. 1.
Figure 1:
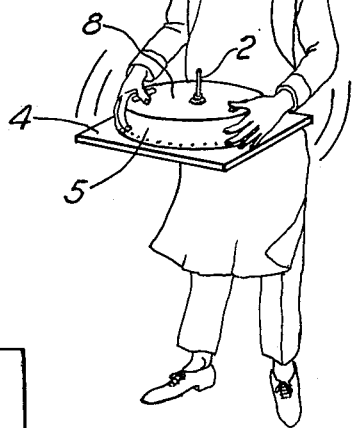
FIG. 1 is a view of an embodiment of the nut shelling device of the invention in use.
Figure 4:
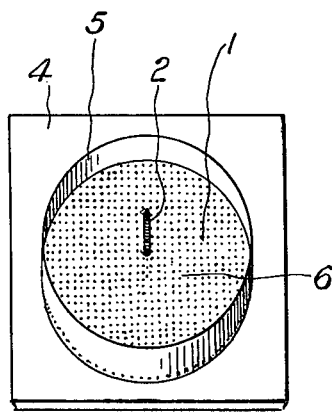
FIG. 4 is a perspective view of an embodiment of the base plate and side of the embodiment of FIG. 1.
Figure 5:
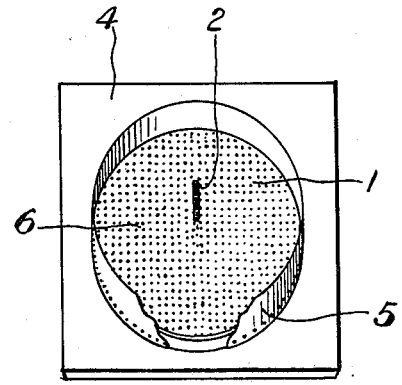
FIG. 5 is a perspective view, partly cut away, of the embodiment of FIG. 4.

The nut shelling device of the invention functions to shell a plurality of hazel or other similar type of nuts, simultaneously. The nut shelling device of the invention comprises a circular base plate 1 (FIGS. 3 to 7) having predetermined diameter D1 (FIG. 3). An elongated bolt 2 (FIGS. 1 and 3 to 7) coaxially extends from a surface 3 (FIG. 3) of the base plate 1.

The base plate 1 may be affixed to a square plate 4 of larger dimensions to facilitate handling thereof (FIGS. 1 and 4 to 7).

A cylindrical side 5 is affixed to the base plate 1 around the circumference thereof (FIGS. 1, 4, 5 and 7).

A plurality of pointed nail-like members 6 (FIGS. 3 to 7) extend from the surface 3 of the base plate 1 in spaced mutual relation substantially parallel to the axis 7 (FIG. 6) of said base plate.

Figure 2:
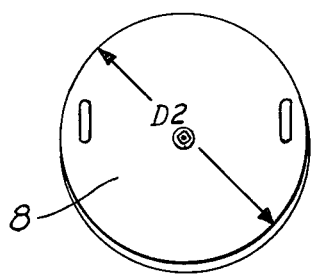
FIG. 2 is a plan view of an embodiment of the cover plate of the embodiment of FIG. 1.

A circular cover plate 8 (FIGS. 1, 2, 6 and 7) has a coaxial bore 9 (FIGS. 6 and 7) formed therethrough. The cover plate 8 has a diameter D2 (FIG. 2) slightly smaller than the predetermined diameter D1.

Figure 6:
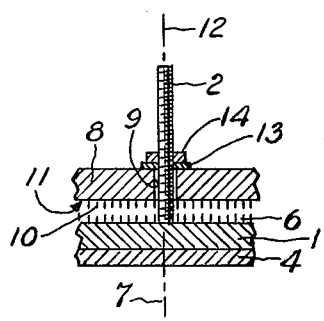
FIG. 6 is a cross-sectional view, on an enlarged scale, of part of the nut shelling device of the invention with the cover secured to the base.
Figure 7:
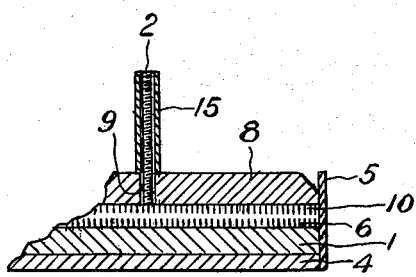
FIG. 7 is a cross-sectional view, on an enlarged scale, of part of the nut shelling device of the invention with a handle on the cover.
Figure 8:
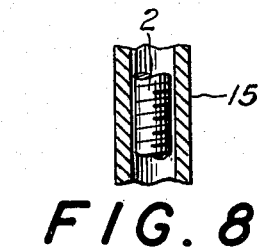
FIG. 8 is a view, on an enlarged scale, of part of the handle of the device of the invention.

A plurality of pointed nail-like members 10 extend from a surface 11 of the cover plate 8 in spaced mutual relation substantially parallel to the axis 12 of said cover plate (FIGS. 6 and 7). A washer 13 and a nut 14 (FIG. 6) threadedly coupled to the bolt 2 of the base plate 1 releasably secure the cover plate 8 to said base plate, in the manner shown in FIGS. 6 and 7, with the nail-like members of each pointed toward the other with the points spaced from each other when the cover plate is coaxially positioned on the base plate with said bolt passing through the bore 9 through said cover plate.

When a plurality of hazel or other, similar type of nuts, are placed on the base plate and the cover plate 8 is thus secured to the base plate 1, and the cover plate is rotated back and forth relative to the base plate a plurality of times, most of the nuts are shelled.

As shown in FIG. 7, a handle 15 having an internally threaded bore may be coaxially affixed to the cover plate 8 and utilized to secure said cover plate to the base plate 1. The handle 15 facilitates handling of the cover plate 8.

The nut shelling device of the invention may be powered by any suitable means other than manually. This includes an electric motor coupled to the device such that the cover plate is rotated back and forth relative to the base plate.

While the invention has been described by means of a specific example and in a specific embodiment, I do not wish to be limited thereto, for obvious modifications will occur to those skilled in the art without departing from the spirit and scope of the invention.

I claim:

1. A nut shelling device for shelling a plurality of nuts simultaneously, said shelling device comprising
   a circular base plate having a predetermined diameter, an elongated bolt coaxially extending from a surface thereof and a circumference;
   a cylindrical side affixed to the base plate around the circumference thereof;
   a plurality of pointed nail-like members extending from the surface of the base plate in spaced mutual relation substantially parallel to the axis of said base plate;
   a circular cover plate having a coaxial bore formed therethrough and a diameter slightly smaller than the predetermined diameter;
   a plurality of pointed nail-like members extending from a surface of the cover plate in spaced mutual relation substantially parallel to the axis of said cover plate; and
   releasable securing means for releasably securing the cover plate to the base plate with the nail-like members of each pointed toward the other with the points spaced from each other with the cover plate coaxially positioned on the base plate with the bolt passing through the bore whereby when the cover plate is secured to the base plate with a plurality of nuts placed on the base plate and the cover plate is rotated back and forth relative to the base plate a plurality of times, most of the nuts are shelled.

* * * * *